(12) United States Patent
Palle

(10) Patent No.: US 7,134,448 B2
(45) Date of Patent: Nov. 14, 2006

(54) TRANSDUCER FOR MONITORING THE POSITION OF A MOVABLE BODY

(75) Inventor: Carsten Palle, Haarby (DK)

(73) Assignee: VID A.p.S., Ringe (DK)

( * ) Notice: Subject to any disclaimer, the term of this patent is extended or adjusted under 35 U.S.C. 154(b) by 24 days.

(21) Appl. No.: 11/148,886

(22) Filed: Jun. 9, 2005

(65) Prior Publication Data

US 2005/0284522 A1 Dec. 29, 2005

(51) Int. Cl.
*F16K 37/00* (2006.01)
(52) U.S. Cl. ............... 137/554; 137/527.8; 73/514.31; 324/207.17; 324/207.24
(58) Field of Classification Search ............... 137/554, 137/527.8; 73/514.31; 324/207.24, 207.17
See application file for complete search history.

(56) References Cited

U.S. PATENT DOCUMENTS

| | | | | |
|---|---|---|---|---|
| 4,958,332 A | * | 9/1990 | Tellerman | 367/140 |
| 5,140,263 A | * | 8/1992 | Leon | 324/207.17 |
| 5,504,426 A | * | 4/1996 | Ricci et al. | 324/207.17 |
| 5,523,682 A | * | 6/1996 | Leon | 324/207.17 |
| 5,986,449 A | * | 11/1999 | Koski | 324/207.13 |
| 2004/0003849 A1 | * | 1/2004 | Rausch et al. | 137/554 |

FOREIGN PATENT DOCUMENTS

| | | |
|---|---|---|
| EP | 0410317 | 7/1990 |
| FR | 2458774 | 12/1981 |
| JP | 57173676 | 10/1982 |

* cited by examiner

*Primary Examiner*—A. Michael Chambers
(74) *Attorney, Agent, or Firm*—William J. Sapone; Coleman Sudol Sapone P.C.

(57) ABSTRACT

A transducer for monitoring the position of movable bodies and in particular for monitoring the position of valve flaps and other elements in connection with systems for fire extinction, is composed of a pipe (4) which is closed at one end and thus forms a hollow body with a bottom (4). The pipe is made of a magnetically inert material and accommodates an inductive sensor (5) of an ordinary type. The sensor is movable inside the pipe, but engages the internal bottom of the pipe in its normal position of use. The transducer is kept in this position by a compression spring (17) which presses against the free end of the cylindrical sensor. With its other end, this compression spring (17) engages a plug (2) at the free end of the pipe. In its position of use, the transducer is arranged such that the bottom of the pipe, and thereby the active face of the sensor, is positioned in the immediate vicinity of the body, e.g. a valve flap, whose position is to be monitored. A cord (6) or another pull member extends from the sensor out through the plug and out into the open. The cord may be the wire from the sensor.

Figure 1:
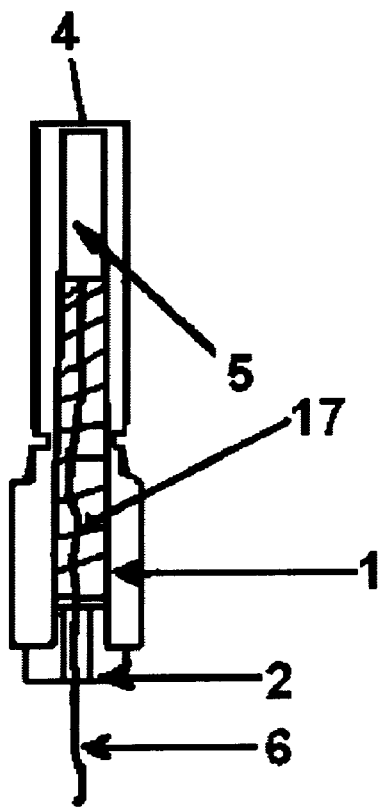

When the function of the transducer is to be tested, an external pull is applied to the cord (6), whereby the sensor is pulled back against the effect of the spring until it is moved out of its scanning range. The pipe and the spring are dimensioned such that this travel is allowed. A test may hereby be performed readily, and without it being necessary to interfere with the normal function of the system.

4 Claims, 3 Drawing Sheets

TRANSDUCER FOR MONITORING THE POSITION OF A MOVABLE BODY

THE PRIOR ART

The invention relates to an inductive transducer for positional monitoring of particularly valve bodies or flaps in connection with fire extinguishing systems, wherein the body or the flap is present in a conduit, and wherein the transducer provides a signal when the valve body or the flap is moved away from a given position.

In particular, the invention is aimed at monitoring the position of valve bodies or liquid flow contacts or corresponding elements which are present in conduits for water or another liquid medium.

In fire extinguishing systems where the water or the fire extinguishing medium is conveyed in pipes, it is known to monitor the flow in the pipe by means of a liquid flow contact with a flap which is affected by the flow in the pipe, so that the flap pivots about a pivot, whereby the flap affects an electrical contact which breaks or makes an electrical connection when the travel of the flap exceeds a specific value.

It is also known to monitor the flow by means of pressure contacts, as the pressure difference which occurs across a diaphragm when a liquid flow is generated, is detected. The function of this arrangement may be tested by artificially generating a pressure difference and observing that the arrangement responds as it should. This arrangement is rather complicated and requires additional piping. Moreover, such a testing results in a loss of extinguishing agent in the generation of the mentioned pressure difference.

Known are also positional indicators with inductive transducers, e.g. For sprinkler systems, where the transducer monitors the position of a valve flap. The transducer includes a coil to which an alternating voltage is applied, thereby generating an induction voltage. The magnitude of the inductive voltage decreases with increasing distance between the coil and its "armature", which is formed by the valve flap to be monitored. When the induced current in the coil has dropped below a predetermined value, which corresponds to the flap having been displaced a predetermined distance from its normal position, an alarm is triggered.

A drawback of this system is that the valve flap has to be activated when the alarm function is to be tested.

THE OBJECT OF THE INVENTION

The object of the invention is to provide an inductive transducer of the type mentioned above, which may readily be replaced without this causing outflow and loss of liquid, and whose effect may be tested without it being necessary to dismantle the transducer or to move the body or to activate the valve, and which is moreover simple to install.

This is achieved by a transducer of the above-mentioned type, in that, as stated in the characterizing portion of claim 1, the inductive sensor of the transducer is arranged in a housing of non-magnetically conductive material, and which is configured as an elongated hollow member which, at its one end, is closed by an end face, and that the sensor is spring-biased in a direction toward this end face by a spring extending between the sensor and a plug at the other end of the housing, and that the sensor has a pull member at its end facing toward the plug, said pull member extending out into the open through an opening in the plug.

The transducer thus appears as a small, tubular insert of a magnetically inert material with a cord or a wire protruding from its one end, and which may be positioned, e.g. screwed in, at the location where the monitoring is to be performed, e.g. At the edge or the end of a valve flap. The transducer may be replaced without loss of liquid, as it is normally positioned in a fitting or in the pipe in a hole which is covered by the flap or the valve.

The transducer may readily be tested while it is positioned in its place and without it being necessary to turn the valve body or the flap, simply by manually pulling the pull member, which may be the wire from the transducer, whereby the sensor inside the insert is pulled away from its active position against the effect of the spring, whose travel expediently has to be greater than the scanning range of the sensor, and can thereby emit a detectable signal if it operates correctly. When the pull member is released again, the sensor is pressed back to its operative position in engagement with the end face.

Thus, claims 2 and 3 define expedient embodiments of the invention.

Claim 4 defines expedient materials for the housing of the transducer.

THE DRAWING

Figure 2:
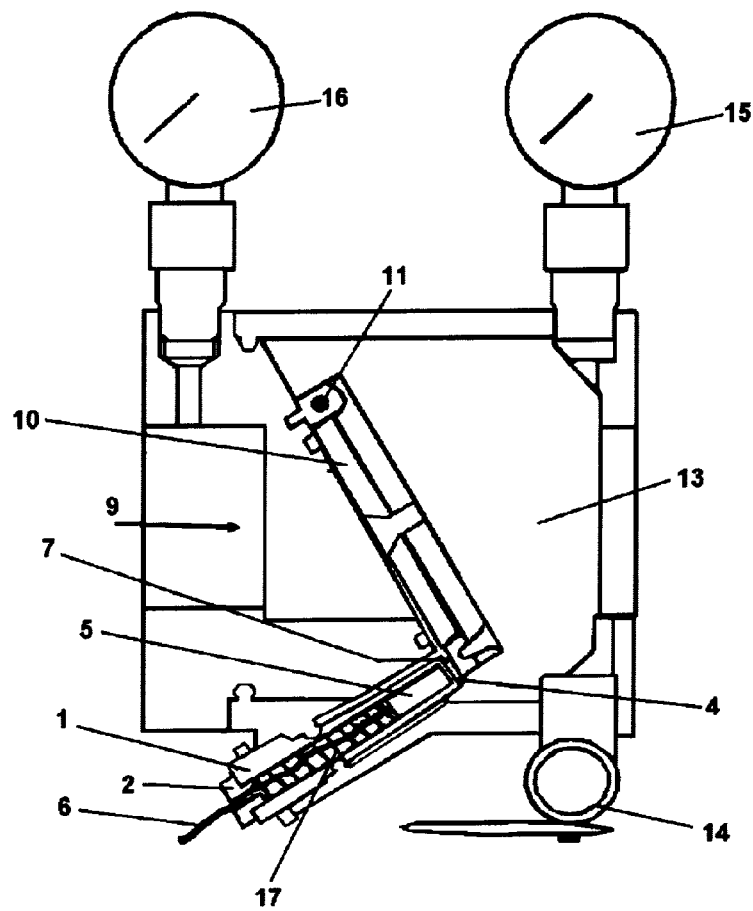
Figure 3:
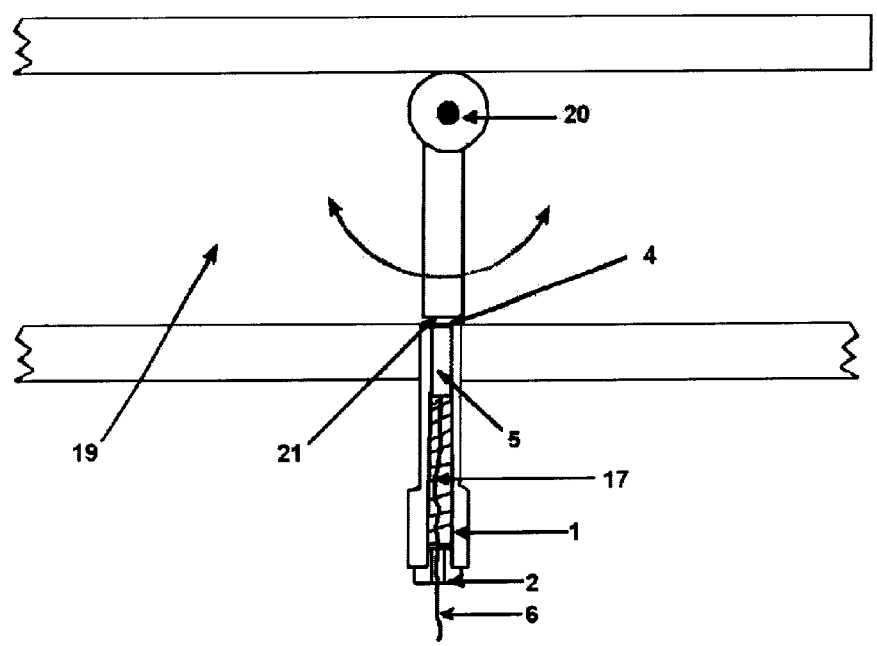

The invention will be explained more fully with reference to the drawing, in which FIG. 1 shows a sectional view of the transducer, FIG. 2 shows the transducer mounted in connection with a valve in a fire extinguishing system, and FIG. 3 shows the transducer in connection with a liquid flow contact.

DESCRIPTION OF EXEMPLARY EMBODIMENTS

FIG. 1 shows the transducer in an axially sectional view. The housing 1 is configured as a pipe which is closed at one end by a bottom 4. The magnetic sensor 5 itself, which is of an ordinary type, is arranged loosely inside the pipe, and in its active position it engages the bottom internally in the pipe. The sensor is pressed against the bottom by a compression spring 17 which, at its other end, engages a plug 2 at the opposite end of the pipe.

A cord or a similar pull element 6 extends from the bottom of the sensor through the plug and out into the open. In one embodiment, this cord may consist of the wire from the transducer. The compression spring, which is a helical spring in the example shown, has a travel which allows the sensor to move out of its active scanning area when a pull is applied to the cord from the outside.

The housing is made of a magnetically inert material, such as plastics, glass or ceramics. The transducer is easy to place at the location of use, e.g. by a threaded connection. The transducer may be removed and inspected or be replaced practically without any loss of liquid. When the transducer is to be tested, this takes place without intervention in the normal function of the system, a pull being merely applied to the wire or the cord, whereby the sensor is moved out of its active area such that a swing of the valve flap with an alarm state is simulated. When the test has been carried out, the spring presses the sensor back against the bottom in the pipe, whereby its normal function is re-established.

FIG. 2 shows a transducer in connection with a swing flap 10 which is arranged in a conduit for a fire extinguishing arrangement with a valve 14. If the valve 14 opens, or a flow is provided in the conduit in another manner, the flap 10 will move away from the position shown, as it will swing out-wards The transducer 1, which is arranged close to the lower periphery of the flap, will record this swing and emit an activation signal. A corresponding activation signal may be provided in a test situation by pulling the cord or the wire 6, whereby the sensor is moved out of its active area. When the pull in the wire ceases, the compression spring returns the sensor to its place.

FIG. 3 shows the transducer used in connection with a flow indicator. A pipe accommodates a flap which is suspended pivotally about an axis 20. When a flow occurs in the pipe, the flap swings out about this axis. the transducer 1 is arranged just below the flap in its position of rest and will respond to a swing above a given size and thereby to a flow through the pipe. Like in the previously mentioned examples, the transducer may be tested without having to pivot the flap, as a pull in the cord or the wire 6 will simulate pivoting movement of the flap.

The invention claimed is:

1. An inductive transducer for positional monitoring of a valve body or flap in a fire extinguishing systems, the body or the flap being present in a conduit, the inductive transducer having a housing (1) made of non-magnetically conductive material and being an elongated hollow member, an inductive sensor (5) movably arranged in the housing (1) for providing a signal when the valve body or the flap is moved away from a given position, the inductive sensor located in the housing at a first end which is closed by an end face (4), the end face being in proximity to the valve body or flap, the sensor being biased in a direction toward the end face by a spring (17) extending between the sensor and a plug (2) located at a second end of the housing, the sensor disposed for positional monitoring of the valve body or flap (5), the sensor having a pull member (6) extending to the plug (2), said pull member extending out of the housing through an opening in the plug such that the sensor can be pulled away from the end face using the pull member by overcoming the spring bias thereby simulating a movement of the valve body or flap without disturbing the valve body or flap.

2. The inductive transducer according to claim 1 wherein the spring (17) is a helical spring having a maximum travel in a direction of compression which is greater than a scanning range of the sensor (5), the pull member (6) extending through an inside hollow of the helical spring (17).

3. The inductive transducer according to claims 1 or 2 wherein the pull member (6) is a wire extending from the sensor (5).

4. The inductive transducer according to any one of claims 1–3 wherein the housing (1) is made of plastics, glass or a ceramic material.

* * * * *